United States Patent
Wu et al.

(10) Patent No.: US 8,331,277 B2
(45) Date of Patent: Dec. 11, 2012

(54) METHOD OF DELIVERING MULTICAST PACKETS IN A MESH NETWORK

(75) Inventors: Feng-Chi Wu, Nantou County (TW); Ming-Ta Li, Hsinchu (TW); Cheng-Tsung Tai, Hsinchu (TW)

(73) Assignee: Ralink Technology, Corp., Science-Based Park, Hsin-Chu (TW)

( * ) Notice: Subject to any disclaimer, the term of this patent is extended or adjusted under 35 U.S.C. 154(b) by 527 days.

(21) Appl. No.: 12/264,208

(22) Filed: Nov. 3, 2008

(65) Prior Publication Data

US 2009/0290562 A1    Nov. 26, 2009

(30) Foreign Application Priority Data

May 21, 2008  (TW) ................. 97118668 A

(51) Int. Cl.
*H04H 20/71* (2008.01)
*H04L 12/28* (2006.01)
*H04J 3/26* (2006.01)

(52) U.S. Cl. ......... 370/312; 370/390; 370/432; 370/338
(58) Field of Classification Search .................. 370/312, 370/432, 338, 328–329, 390
See application file for complete search history.

(56) References Cited

U.S. PATENT DOCUMENTS

| | | | | |
|---|---|---|---|---|
| 7,869,434 B2* | 1/2011 | Roh et al. | ...... | 370/390 |
| 8,085,710 B2* | 12/2011 | Kumar et al. | ...... | 370/328 |
| 8,259,635 B2* | 9/2012 | Thubert et al. | ...... | 370/312 |
| 2001/0005368 A1* | 6/2001 | Rune | ...... | 370/390 |
| 2006/0126535 A1* | 6/2006 | Sherman | ...... | 370/254 |
| 2007/0081482 A1* | 4/2007 | Roh et al. | ...... | 370/312 |
| 2007/0250713 A1* | 10/2007 | Rahman et al. | ...... | 713/171 |
| 2008/0151916 A1* | 6/2008 | Jetcheva et al. | ...... | 370/401 |
| 2008/0291862 A1* | 11/2008 | Lu | ...... | 370/312 |
| 2008/0304485 A1* | 12/2008 | Sinha et al. | ...... | 370/392 |
| 2008/0317047 A1* | 12/2008 | Zeng et al. | ...... | 370/401 |
| 2009/0046614 A1* | 2/2009 | Lewis et al. | ...... | 370/312 |

* cited by examiner

*Primary Examiner* — Kwang B Yao
*Assistant Examiner* — Candal Elpenord
(74) *Attorney, Agent, or Firm* — Winston Hsu; Scott Margo

(57) ABSTRACT

In a mesh network, when a wireless mesh link exists between a first mesh access point and a second mesh access point, the first mesh access point can deliver a multicast packet to the second mesh access point through the wireless mesh link. When the second mesh access point determines that the multicast packet from the first mesh access point is a redundant packet, the second mesh access point will send a multi-path notice to the first mesh access point. After receiving the multi-path notice, the first mesh access point stops delivering the multicast packet through the path.

9 Claims, 9 Drawing Sheets

METHOD OF DELIVERING MULTICAST PACKETS IN A MESH NETWORK

BACKGROUND OF THE INVENTION

1. Field of the Invention

The present invention relates to a method of delivering multicast packets in a mesh network, and more particularly, to a method of delivering multicast packets and preventing multi-paths in a mesh network.

2. Description of the Prior Art

Wireless mesh network (WMN) is a key technology for next-generation wireless networks. The wireless mesh network supports ad-hoc networking and has the self-organization and self-configuration properties. The wireless mesh network serves as an access network that employs multi-hop wireless forwarding by non-mobile nodes to relay data to and from Internet. It was announced that the wireless mesh network could provide data transmission rate up to 134.4 mbps, which satisfies the requirement of the next-generation high-speed wireless networks.

Please refer to FIG. 1. FIG. 1 is a schematic diagram of a wireless mesh network according to the prior art. The wireless mesh network comprises two kinds of mesh nodes, a mesh portal (MB) 12 and mesh access points (MP) 14. The mesh portal 12 is a gateway between the Internet and the wireless mesh network, for delivering data from the wireless mesh network to the Internet, or from the Internet to the wireless mesh network. The mesh access point 14 provides a wireless network service directly to a mobile station (MS) 16 through a wireless access link. When the radio of the mesh access points 14 can cover each other, a wireless mesh link exists between the two mesh access points 14 and each of two mesh access points 14 can deliver the data through the link. The mesh access points 14 and the mesh portal 12 construct a mesh distribution system. In other words, the mesh access points 14 communicates with the mesh portal 12 through a mesh network protocol, and the mesh access point 14 communicates with the mobile station 16 through many protocols, such as IEEE 802.11 and mobile telecommunication network.

When the mobile station 16 enters the service range of the mesh access point 14, the mobile station 16 performs an association procedure to establish a wireless mesh link with the mesh access point 14. The mesh access point 14 is a serving mesh access point of the mobile station 16. Through the wireless mesh network, the mobile station 16 can communicate with other mobile stations 16 in the wireless mesh network or other hosts in the Internet. For example, the data delivering to the mobile station 16 are relayed between different mesh access points 14, and the data are delivered to the serving mesh access point of the mobile station 16 finally. In the wireless mesh network, each mesh access point 14 delivers not only the data of the mobile station 16 in the service range but also the data from other mesh access point 14. In addition, the wireless communication uses the broadcast transmission. If the transmission between each mesh access point 14 is not scheduled effectively, the transmission of the mesh access point 14 may collide so as to reduce the performance of the wireless mesh network. Thus, there is a protocol to control the period or frequency of the transmission of each mesh access point 14, which is the medium access control (MAC) protocol of the wireless network. In addition, before delivering the data to the mobile station 16, the mesh access point 14 has to determine which mesh access point 14 is the serving mesh access point of the mobile station 16. The mobile station 16 can move so it may associate with different serving mesh access point. Thus, a mobility management and a routing mechanism are specified in the network layer of the protocol of the wireless network.

Please refer to FIG. 2 and FIG. 3. FIG. 2 to FIG. 3 are schematic diagrams of mesh access points delivering a multicast packet according to the prior art. The wireless mesh network comprises four mesh access points, and between each mesh access point has a wireless mesh link. A first mesh access point 121 (source terminal) uses a multicast transmission to break a frame into multiple unicast packets and deliver the packets to each peer mesh access point respectively. On receipt of the packet, the mesh access point forwards the packet to each peer mesh access point using same mechanism. The same packet will be delivered many times since multi-paths exist in the mesh network. As shown in FIG. 2, the first mesh access point 121 delivers a multicast packet to the second, third, and fourth mesh access point 122, 123, 124. As shown in FIG. 3, the second, third, and fourth mesh access point 122, 123, 124 forward the multicast packet to the peer mesh access point. Accordingly, the forwarding multicast packets are unnecessary and waste the channel resource.

SUMMARY OF THE INVENTION

According to an embodiment of the present invention, a method of delivering multicast packets for a mesh network comprises: establishing a first wireless mesh link between a first mesh access point and a second mesh access point; establishing a second wireless mesh link between the second mesh access point and a third mesh access point; the second mesh access point receiving a multicast packet from the first mesh access point through the first wireless mesh link; the second mesh access point receiving the multicast packet from the third mesh access point through the second wireless mesh link; and the second mesh access point sending a multi-path notice to the third mesh access point.

According to another embodiment of the present invention, a method of delivering multicast packets for a mesh network comprises: a first mesh access point delivering a multicast packet to a second mesh access point; when the second mesh access point determines the multicast packet from the first mesh access point as a redundant, the second mesh access point sending a multi-path notice to the first mesh access point; and the first mesh access point stopping delivering the multicast packet to the second mesh access point after receiving the multi-path notice.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
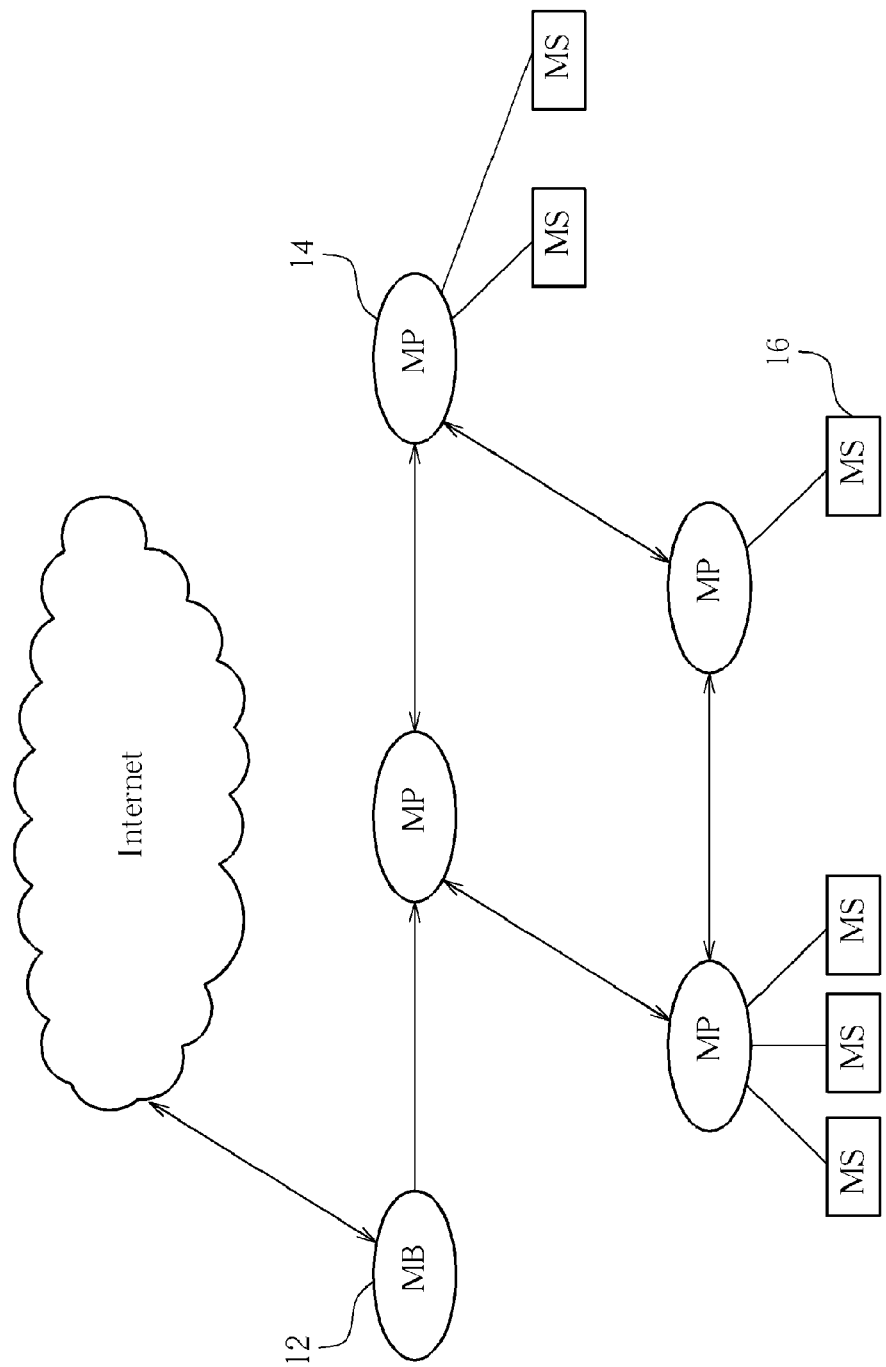
FIG. 1 is a schematic diagram of a wireless mesh network according to the prior art.
Figure 2:
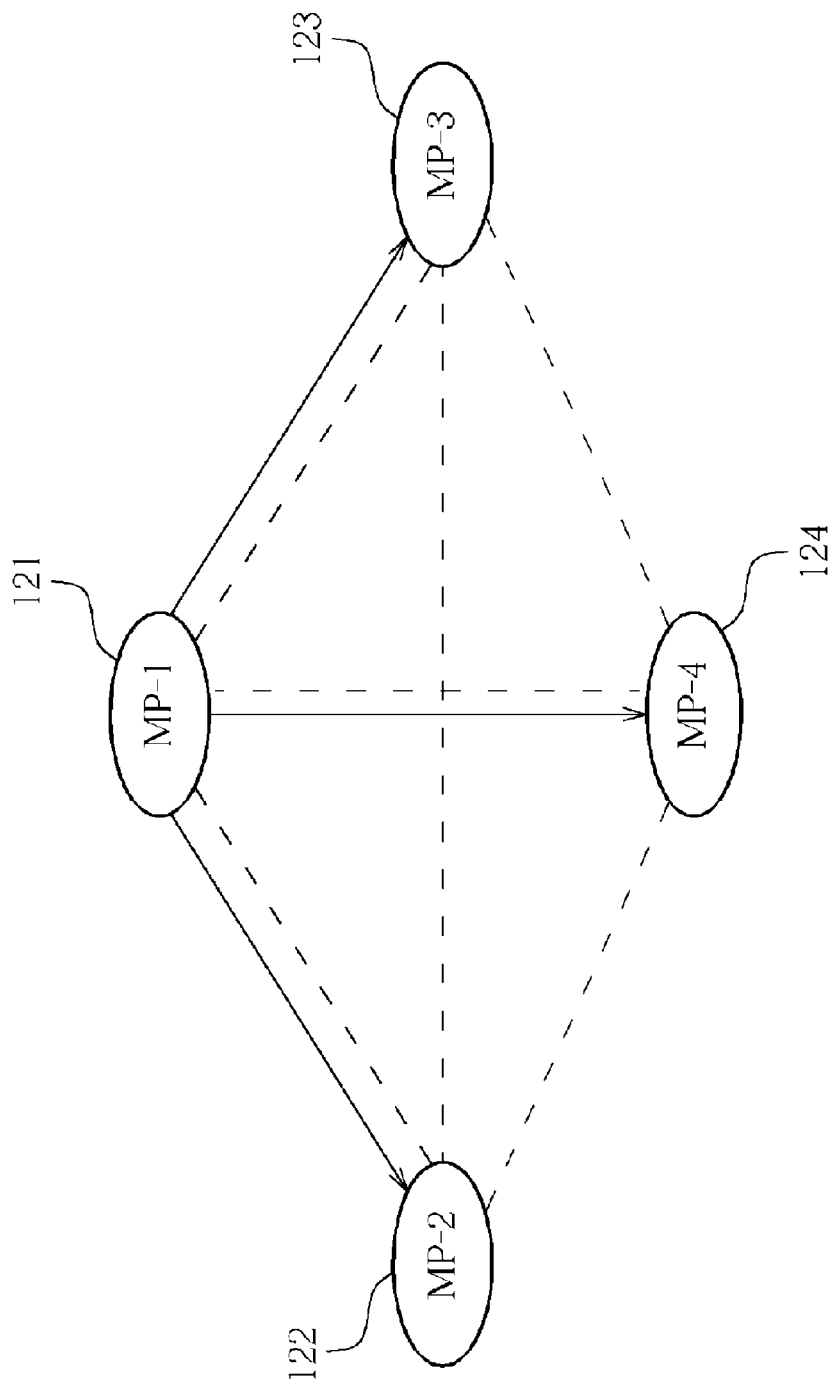
FIG. 2 and FIG. 3 are schematic diagrams of mesh access points delivering a multicast packet according to the prior art.
Figure 3:
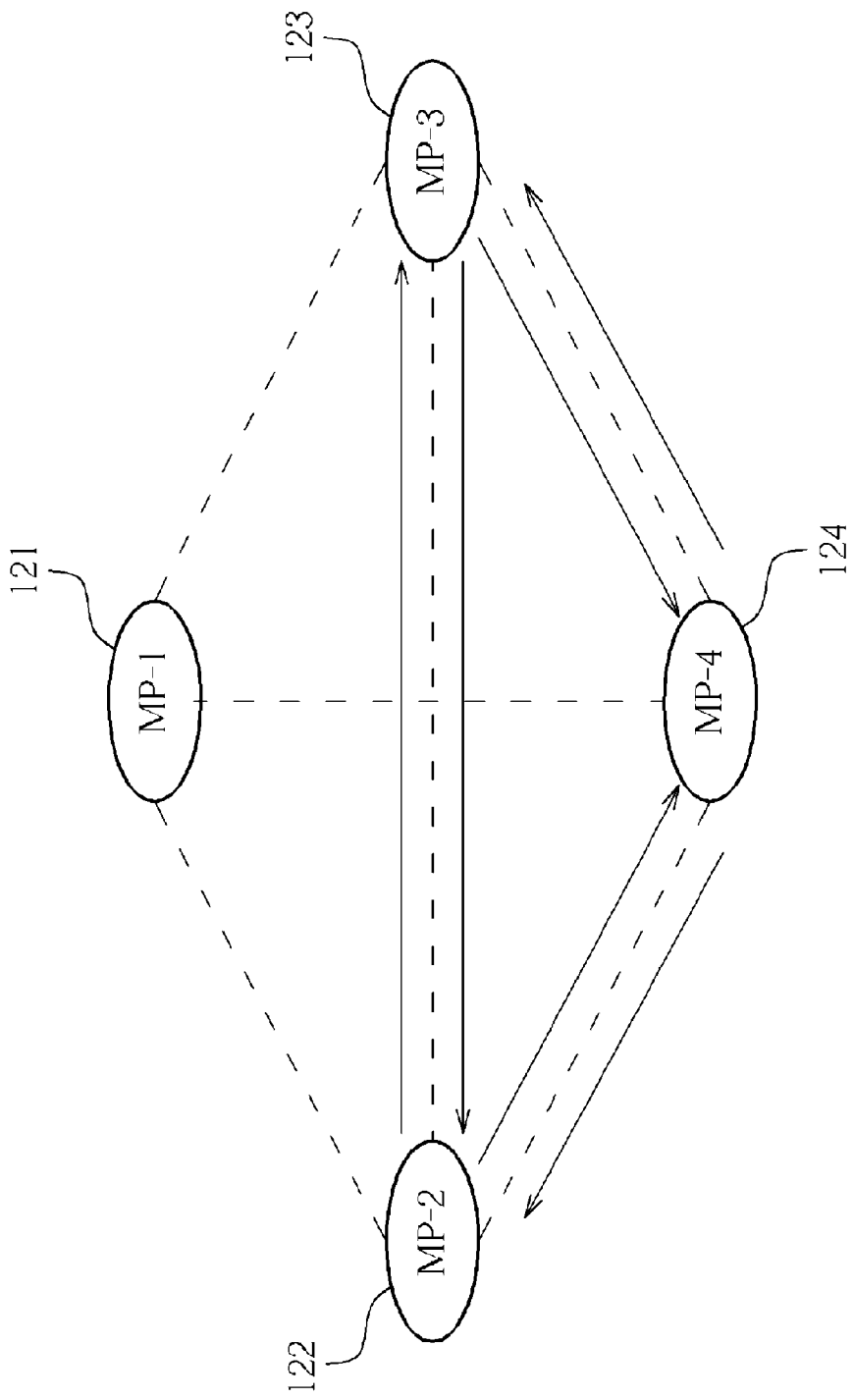
Figure 4:
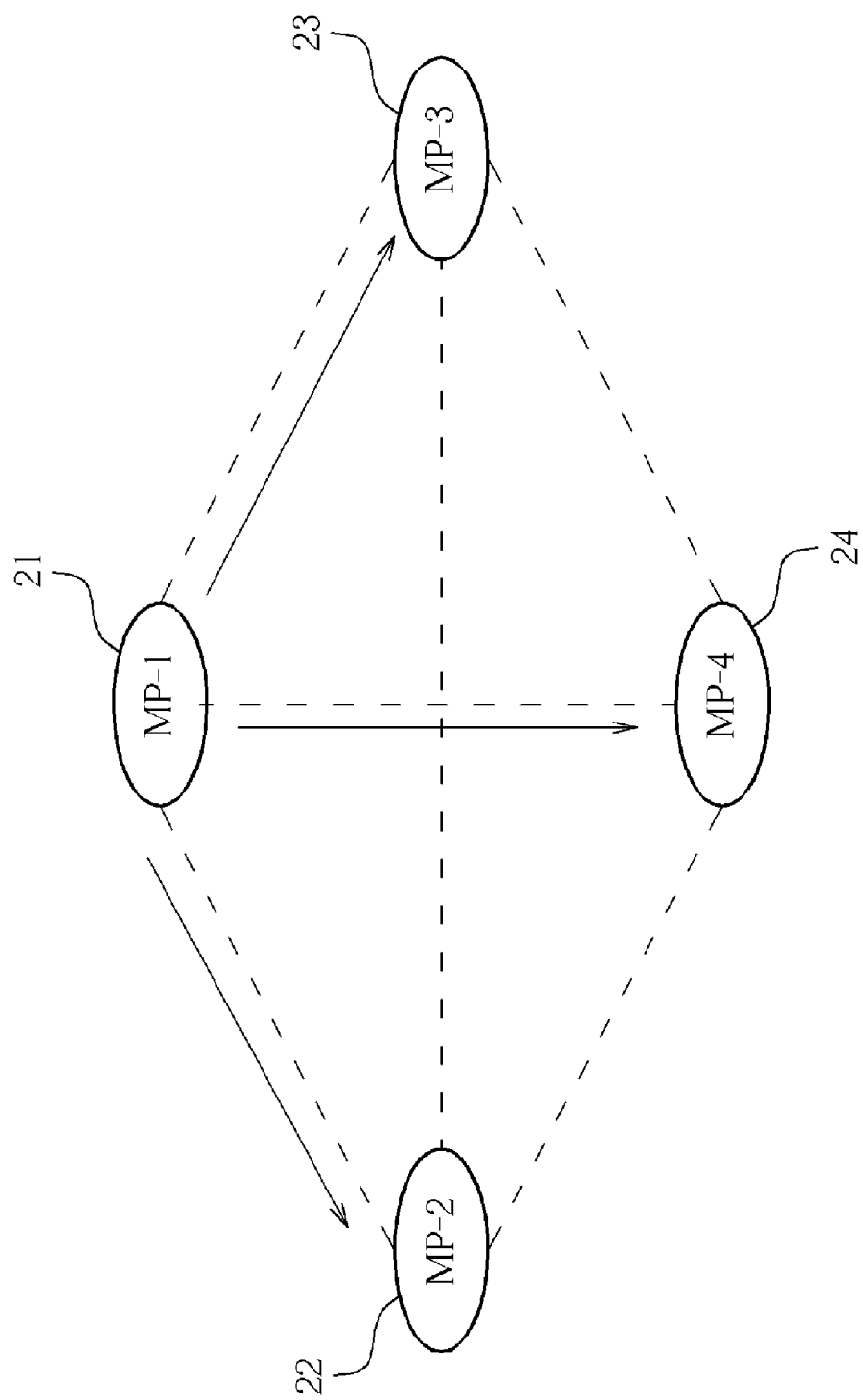
FIG. 4 to FIG. 8 are schematic diagrams showing an embodiment of mesh access points delivering a multicast packet according to the present invention.
Figure 5:
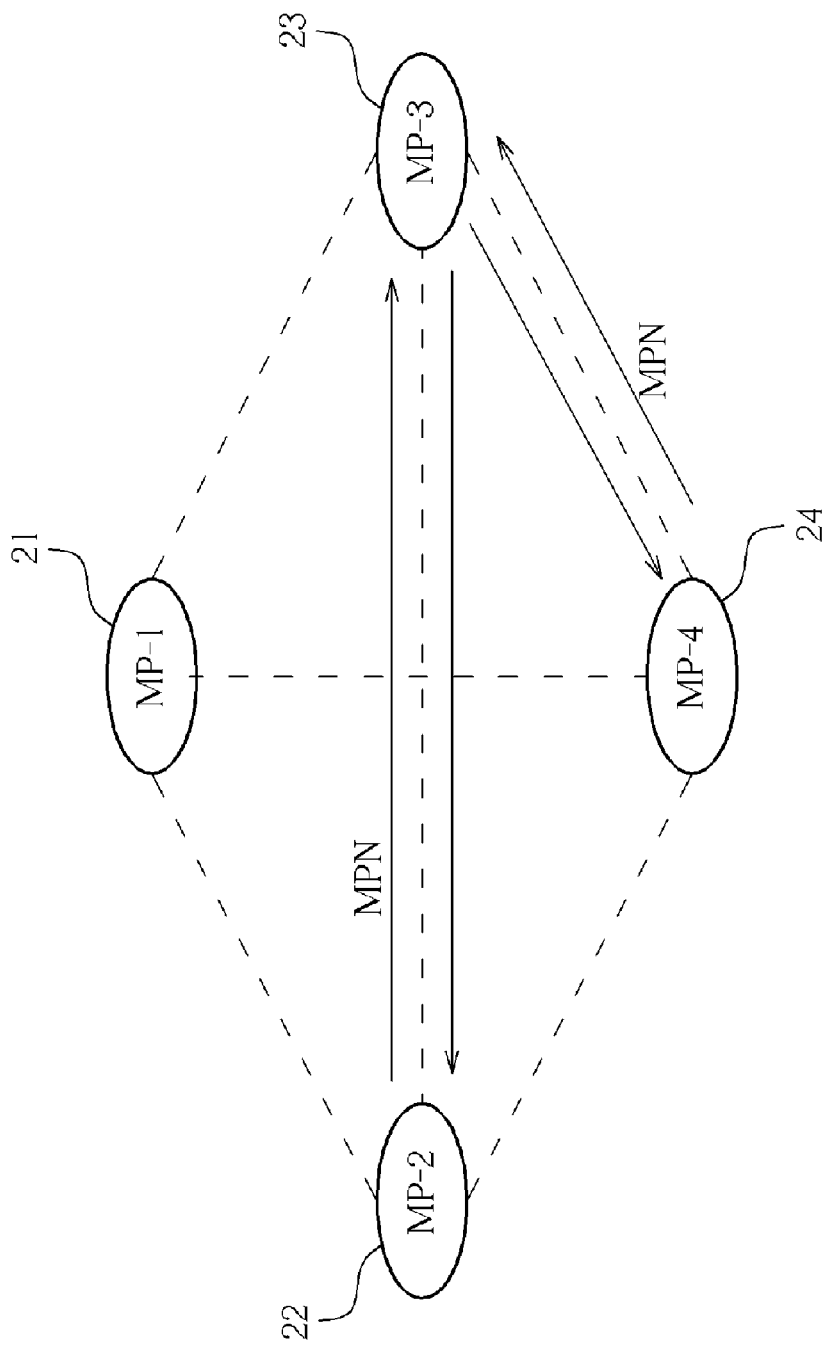
Figure 6:
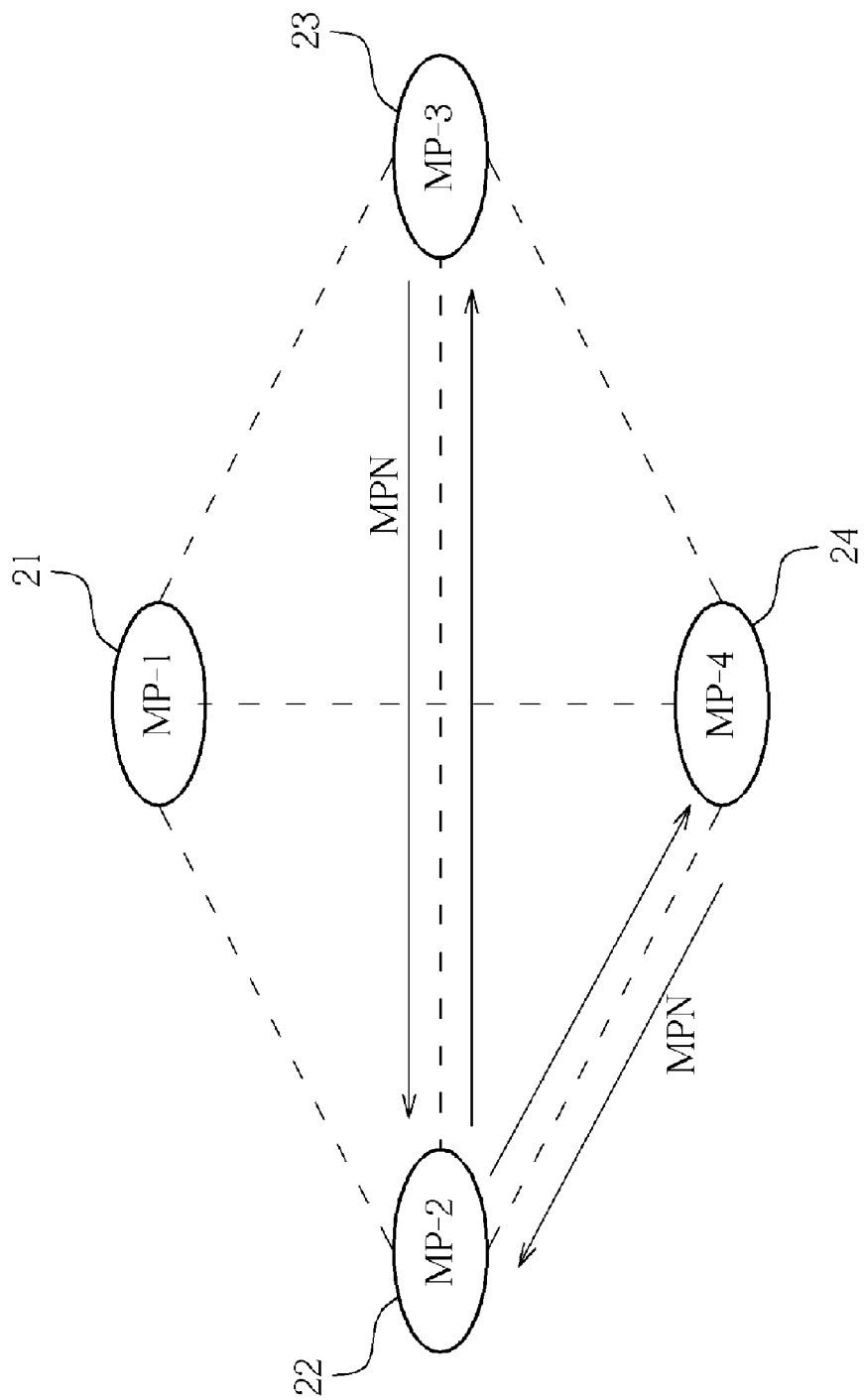
Figure 7:
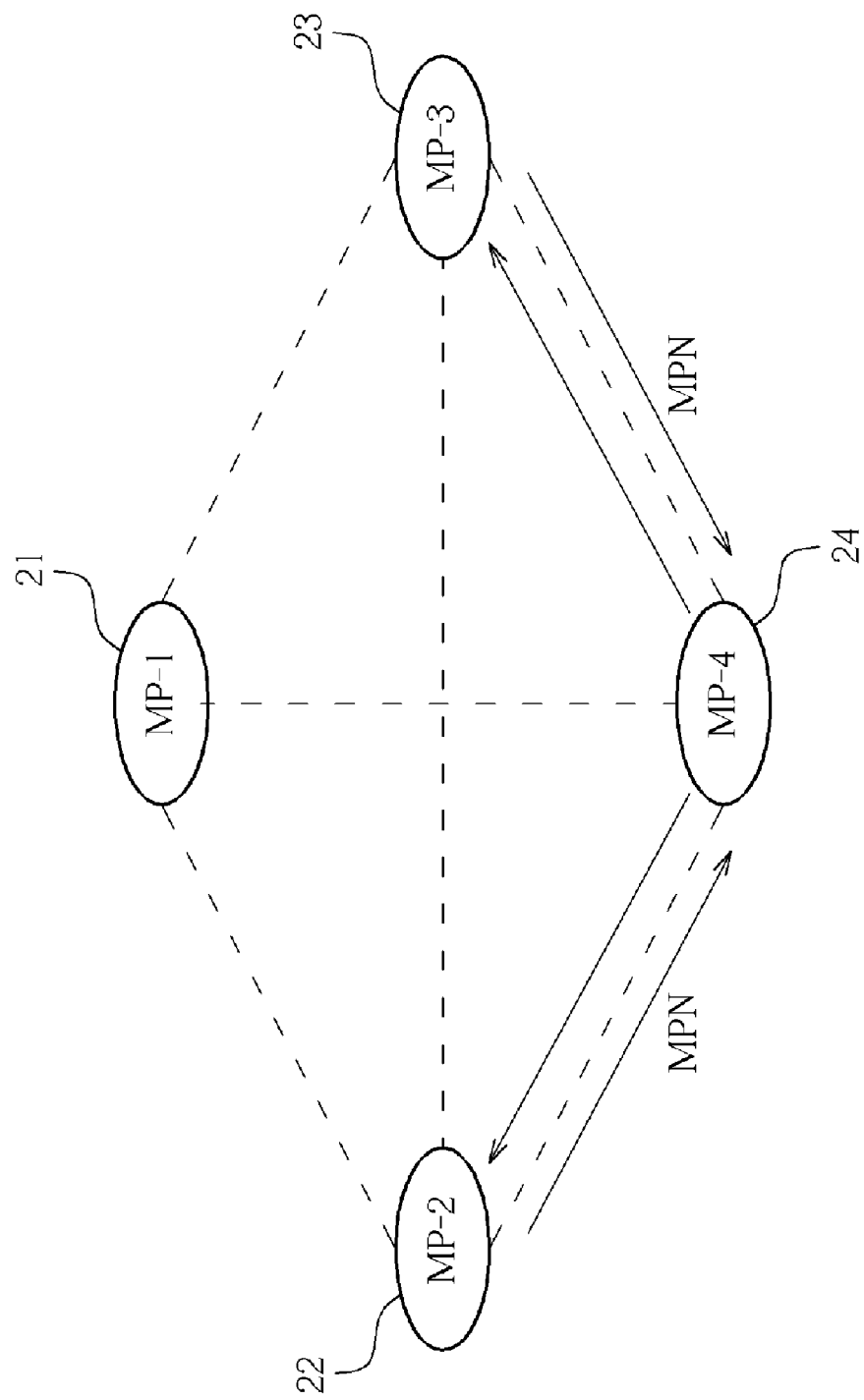
Figure 8:
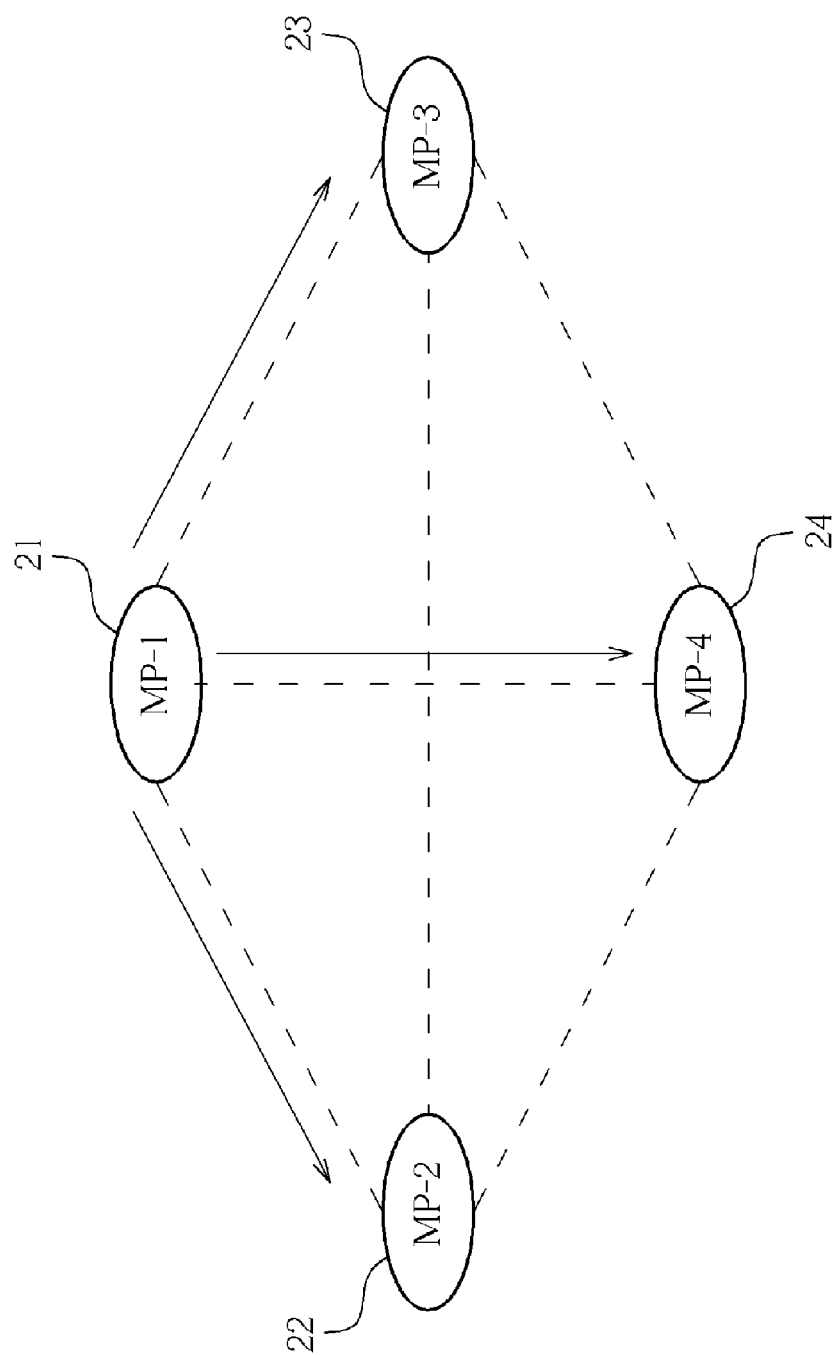

Please refer to FIG. 4 to FIG. 8. FIG. 4 to FIG. 8 are schematic diagrams showing an embodiment of mesh access points delivering a multicast packet according to the present invention. To prevent the mesh access point from delivering the duplicate multicast packet that results in resource waste, the present invention provides a simple and efficient method for detecting the redundant paths and notifying the peer mesh access points to stop delivering the multicast packet through the path for a predetermined period. The predetermined period can prevent the path from blocking permanently. The network will be detected again after the predetermined period. In this embodiment, the wireless mesh network comprises four mesh access points, and between each mesh access point has a wireless mesh link. As shown in FIG. 4, the first mesh access point 21 delivers a multicast packet to the second, third, and fourth mesh access point 22, 23, 24. As shown in FIG. 5, after receiving the multicast packet from the first mesh access point 21, the third mesh access point 23 delivers the same multicast packet to the peer mesh access point, the second mesh access point 22 and the fourth mesh access point 24. However, the second mesh access point 22 and the fourth mesh access point 24 have received the multicast packet from the first mesh access point 21 already. Thus, the second mesh access point 22 sends a multi-path notice MPN to the third mesh access point 23 to indicate that the path is unnecessary. Similarly, the fourth mesh access point 24 sends a multi-path notice MPN to the third mesh access point 23 to indicate that the path is unnecessary. As shown in FIG. 6, after receiving the multicast packet from the first mesh access point 21, the second mesh access point 22 delivers the same multicast packet to the peer mesh access points, the third mesh access point 23 and the fourth mesh access point 24. However, the third mesh access point 23 and the fourth mesh access point 24 have received the multicast packet from the first mesh access point 21 already. Thus, the third mesh access point 23 sends a multi-path notice MPN to the second mesh access point 22 to indicate that the path is unnecessary. Similarly, the fourth mesh access point 24 sends a multi-path notice MPN to the second mesh access point 22 to indicate that the path is unnecessary. As shown in FIG. 7, after receiving the multicast packet from the first mesh access point 21, the fourth mesh access point 24 delivers the same multicast packet to the peer mesh access points, the second mesh access point 22 and the third mesh access point 23. However, the second mesh access point 22 and the third mesh access point 23 have received the multicast from the first mesh access point 21 already. Thus, the fourth mesh access point 24 sends a multi-path notice MPN to the second mesh access point 22 to indicate that the path is unnecessary. Similarly, the fourth mesh access point 24 sends a multi-path notice MPN to the third mesh access point 23 to indicate that the path is unnecessary. As shown in FIG. 8, after the peer mesh access points of the first mesh access point 21 have determined the multi-path, the first mesh access point 21 has the best path for delivering the multicast packet in the wireless mesh network.

According to the present invention, each mesh access point can determine where the source terminal of the received multicast packet is. For example, the second, third, and fourth mesh access point 22, 23, 24 receive the multicast packet delivered from the first mesh access point 21 (source terminal). For the second mesh access point 22, when the second mesh access point 22 receives the same multicast packet from the third mesh access point 23, since the second mesh access point 22 has received the multicast packet from the first mesh access point 21, the second mesh access point 22 determines that the multicast packet from the third mesh access point 23 is a redundant packet. That is, the path of delivering the multicast packet generated by the first mesh access point 21 through the third mesh access point 23 is a redundant path.

Thus, the second mesh access point 22 sends a multi-path notice MPN to the third mesh access point 23 to indicate that the path is unnecessary. After receiving the multi-path notice MPN, third mesh access point 23 stops delivering the multicast packet generated by the first mesh access point 21 to the second mesh access point 22 for a predetermined period. The predetermined period is about several minutes. In addition, when the second mesh access point 22 receives the same multicast packet from the fourth mesh access point 24, the second mesh access point 22 can determine than the multicast packet from the fourth mesh access point 24 is a redundant packet. Thus, the second mesh access point 22 sends a multi-path notice MPN to the fourth mesh access point 24 to indicate that the path is unnecessary. Similarly, the third mesh access point 23 and the fourth mesh access point 24 can determine the path of the multicast packet according to the same mechanism so as to have the best path for the multicast packet.

Figure 9:
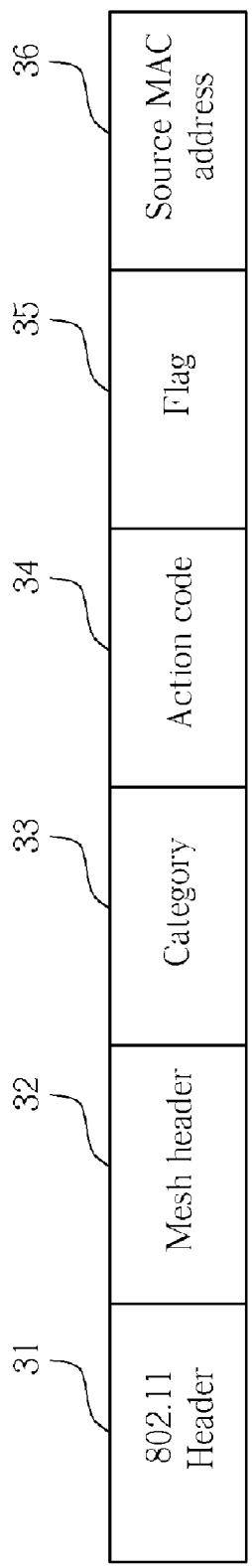
FIG. 9 is a table of a multi-path notice according to the present invention.

Please refer to FIG. 9. FIG. 9 is a table of a multi-path notice according to an embodiment of the present invention. The mesh access points of the present invention use the multi-path notice to stop the delivering path of the multicast packet so as to increase the efficiency when the mesh access points deliver the multicast packet. In the embodiment, the format of the multi-path notice comprises six columns. The first column 31 represents 802.11 Header. The second column 32 represents Mesh Header. The first column 31 and the second column 32 refer to IEEE 802.11 and 802.11s specification. The third column 33 represents the category. The length of the third column 33 is 8 bits. The third column 33 defines the data types. For example, the data is notice type. The fourth column 34 represents the action code. The length of the fourth column 34 is 8 bits. The fourth column 34 defines the function of the data. For example, the data is for multi-path notice. The fifth column 35 represents the flag. The length of the fifth column 35 is 8 bits. The fifth column 35 defines if the multicast packet is enabled. "0" indicates disable, and "1" indicates enable. The sixth column 36 represents the medium access control (MAC) address of the source. The length of the sixth column 36 is six 8 bits. The sixth column 36 records the MAC address of the mesh access point generating the multicast packet. In the embodiment of FIG. 4 to FIG. 8, the sixth column 36 of the multi-path notice MPN records the MAC address of the first mesh access point 21. The mesh access point delivers the multi-path notice according to FIG. 9 to the peer mesh access point to notify that the path for the multicast packet is redundant, so the multicast packet delivered through the path is unnecessary.

In conclusion, the method of delivering multicast packets for a mesh network according to the present invention can improve the efficiency when mesh access points deliver the multicast packets. In a mesh network, when a wireless mesh link exists between a first mesh access point and a second mesh access point, the first mesh access point can deliver a multicast packet to the second mesh access point through the wireless mesh link. When the second mesh access point determines that the multicast packet from the first mesh access point is a redundant packet, the second mesh access point will send a multi-path notice to the first mesh access point. After receiving the multi-path notice, the first mesh access point stops delivering the multicast packet through the path. Thus, the present invention prevents the mesh access point delivering the duplicate multicast packet resulting in the resource waste.

Those skilled in the art will readily observe that numerous modifications and alterations of the device and method may be made while retaining the teachings of the invention.

What is claimed is:

1. A method of delivering multicast packets for a mesh network, comprising: establishing a first wireless mesh link between a first mesh access point and a second mesh access point; establishing a second wireless mesh link between the second mesh access point and a third mesh access point; the second mesh access point receiving a multicast packet from the first mesh access point through the first wireless mesh link; the second mesh access point receiving the multicast packet from the third mesh access point through the second wireless mesh link; the second mesh access point sending a multi-path notice to the third mesh access point; and the third mesh access point stopping delivering a subsequent multicast packet to the second mesh access point after receiving the multi-path notice.

2. The method of claim 1, wherein the step of the second mesh access point sending the multi-path notice to the third mesh access point is when the second mesh access point determines the multicast packet from the third mesh access point as a redundant.

3. The method of claim 1, wherein the third mesh access point stops delivering the subsequent multicast packet to the second mesh access point during a predetermined period after receiving the multi-path notice.

4. The method of claim 1, further comprising:
establishing a third wireless mesh link between the first mesh access point and the third mesh access point; and
the third mesh access point receiving the multicast packet from the first mesh access point through the third wireless mesh link.

5. The method of claim 4, further comprising:
the third mesh access point receiving the multicast packet from the second mesh access point through the second wireless mesh link; and
the third mesh access point sending the multi-path notice to the second mesh access point.

6. The method of claim 5, wherein the step of the third mesh access point sending the multi-path notice to the second mesh access point is when the third mesh access point determines the multicast packet from the second mesh access point as a redundant.

7. The method of claim 5, further comprising:
the second mesh access point stopping delivering the subsequent multicast packet to the third mesh access point during a predetermined period after receiving the multi-path notice.

8. The method of claim 1, wherein the multi-path notice comprises a medium access control (MAC) address of the first mesh access point.

9. The method of claim 1, wherein the multi-path notice is provided according to the standard of IEEE 802.11 and 802.11s.

* * * * *